Figure 1:
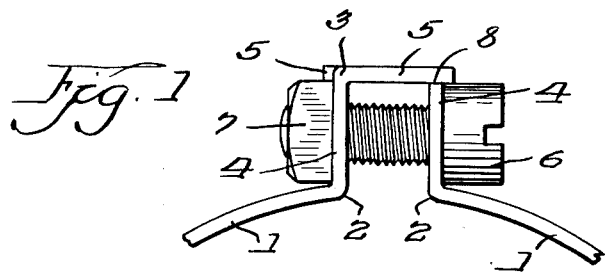

May 26, 1964

H. KREIDEL, SR., ET AL 3,134,155

STRAP CLAMPING DEVICE

Filed July 31, 1962

Inventors.
Hans Kreidel, Sr. &
Hans Kreidel, Jr.

By

Atty.

3,134,155
STRAP CLAMPING DEVICE
Hans Kreidel, Sr., and Hans Kreidel, Jr., Wiesbaden, Germany, assignors to Inventex G.m.b.H., Baden, Aargau, Switzerland, a company of Switzerland
Filed July 31, 1962, Ser. No. 213,824
Claims priority, application Germany Aug. 3, 1961
2 Claims. (Cl. 24—279)

The invention disclosed herein relates to straps for firmly tightening objects such as hose, pipes, receptacles and the like, and is particularly concerned with a tightening and clamping device for such straps.

Clamping devices of this kind are known in diverse structural embodiments. The object of the invention is to improve the clamping device used in connection with tightening strap, which is of simple construction and operates reliably while avoiding certain drawbacks of prior clamping devices.

Clamping devices of the indicated kind are employed in connection with straps which are to be in close engagement with and surrounding the body which is to be tightened, as completely as possible, the ends of such strap being drawn together by means of a tightening or clamping screw cooperating with an associated nut, so as to hold the strap in firm engagement with the corresponding object. Clamping devices of this kind can be readily mounted even in places which are difficultly accessible. However, they have the disadvantage that the ends of the strap yield upon tightening the clamping screw so that its full tightening force cannot become operative. The provision of reinforcing means for the ends of the strap, clamping blocks and the like, brings about an improvement but is likewise insufficient for permitting the full application of the force of the clamping screw. The reason for this drawback resides in the fact that the clamping blocks necessarily assumed, incident to the tightening action of the screw, an angular position, whereby the screw is loaded with bending stresses and is in the presence of a strong tightening force likely to break.

In order to improve this situation, there have been proposed diverse embodiments for the parallel guidance of the clamping blocks so as to avoid bending of the clamping screw. Complicated and expensive structures of this kind have been proposed which are however not effective to prevent bending of the clamping screw, thus also preventing the application of the full force thereof.

The present invention proposes an extremely simple and inexpensive clamping device adapted to guide the ends of the strap positively and reliably in parallel relationship, so that the clamping force of the tightening screw can be fully applied without danger of bending the screw, thereby also imparting to the clamping device increased stability with increasing tightening force. There is no welding involved in connection with the clamping device according to the invention and such device can therefore be made of stainless steel.

The device according to the invention comprises a strap which is at both ends thereof provided with angularly extending supporting parts in which are formed openings for the passage of the clamping screw, such parts being provided with mutually cooperable extensions which move toward one another upon tightening the clamping screw, for sliding support with respect to the oppositely positioned supporting members, in a direction extending in parallel with the axis of the clamping screw.

Details of the invention will appear from the description which is rendered below with reference to the accompanying drawing showing an embodiment thereof.

Figure 2:
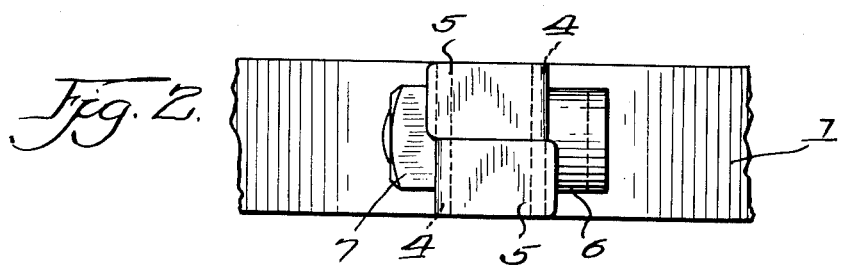
Figure 3:
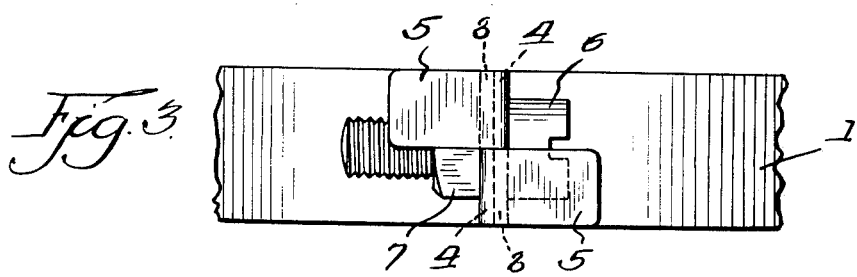
Figure 4:
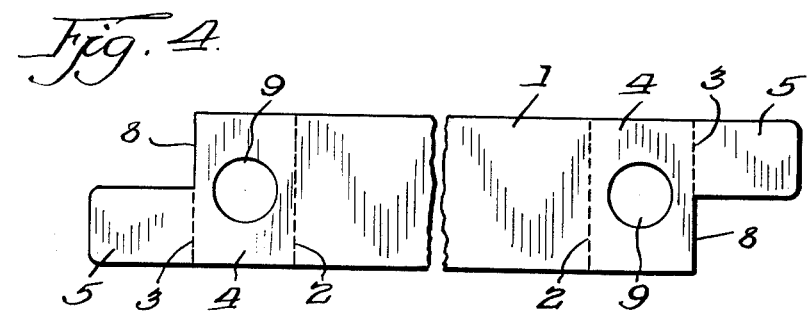

FIG. 1 shows the clamping device in side view, in a position before the tightening;
FIG. 2 shows the device in top elevation, in position before the tightening;
FIG. 3 shows the device in top elevation after the tightening; and
FIG. 4 shows a single-part strap in developed view.

In FIG. 1, numeral 1 indicates the strap and numeral 2 the corners from which the strap parts extend angularly away from the object to which the strap is applied. The supporting parts are formed as rigid angular parts extending from the edge 3, the supporting arm being indicated by numeral 4 and the sliding arm which extends across the gap of the clamp device being indicated at 5. The width of the supporting arms corresponds to the width of the strap and the width of the gliding arms corresponds approximately to one-half of the strap width. The clamping screw is indicated at 6 and the cooperating nut is indicated at 7.

Upon tightening the clamping screw 6, the supporting arms 4 move toward each other. The slide or glide arms 5 extending from the supporting arms 4 glide thereby alongside one another, with increasing stiffening owing to decreasing supporting length, over the free upper ends of the supporting arms 4. The strap is in this manner tightened about the object surrounded thereby. FIG. 4 shows in dotted lines the areas at which the parts are to be bent in right angles to form the strap ends. The holes 9 serve for receiving the clamping screw 6.

It is within the scope of the invention to provide changes and modifications for the purpose of reducing the costs or for reinforcing the device or to facilitate the mounting thereof, for example, to provide for the clamping screw instead of the nut 7, an internal thread in the corresponding strap part, or to reinforce such part or the corners of the strap by the provision of profiles impressed thereon; likewise, the clamping device may be made of wire provided that the parallel guidance of the strap portions is secured with respect to the axis of the clamping screw. The gliding arms at the ends of the strap may differ from the illustrated embodiment, for example, they may be made to extend edge-wise instead of flat or they may be formed in the manner of bolts which are fastened in the angular supporting arms, for gliding motion with respect to corresponding recesses formed in the supporting arms. It is of course also possible to use instead of a strap having clamping means integral therewith, a structure wherein the clamping means are separate parts which are appropriately connected with the strap.

Changes and modifications may accordingly be made within the scope and spirit of the appended claims which define what is believed to be new and desired to have protected by Letters Patent.

We claim:
1. A clamping device for a strap which is to be tightened about a desired object, formed from the ends of the corresponding strap, said ends being bent to form a pair of spaced angularly extending oppositely disposed supporting members provided with respective holes formed therein of a size to relatively snugly receive a clamping screw, cooperable with a nut threaded thereon, for drawing said supporting members toward each other, the free end of each supporting member having a rigid extension formed thereon by bending the material forming the strap transversely to the associated supporting member toward the other supporting member, said extensions moving toward each other, upon tightening said screw, with each extension extending from its associated supporting member across the gap between said supporting members, and in sliding engagement with the other supporting member, in a direction extending parallel with the axis of said screw.

2. A clamping device according to claim 1, wherein said supporting members are rigid parts having a width corresponding to the width of said strap, the respective extensions having a width corresponding approximately to one-half of the width of said strap and moving, upon tightening of said screw, alongside one another in gliding engagement with the free ends of the respective supporting members.

References Cited in the file of this patent

UNITED STATES PATENTS

| | | |
|---|---|---|
| 1,272,541 | Scott | July 16, 1918 |
| 1,447,956 | Blaise | Mar. 13, 1923 |
| 1,505,255 | Gold | Aug. 19, 1924 |
| 2,042,263 | Valley | May 26, 1936 |
| 2,042,955 | Muntz | June 2, 1936 |
| 2,708,299 | Stecher | May 17, 1955 |
| 2,897,568 | Hoke | Aug. 4, 1959 |